(12) United States Patent
McGee

(10) Patent No.: US 10,728,523 B1
(45) Date of Patent: Jul. 28, 2020

(54) SYSTEM AND METHOD FOR USE OF 3D VISUAL SENSORS ON MECHANIZED IRRIGATION MACHINERY

(71) Applicant: Valmont Industries, Inc., Omaha, NE (US)

(72) Inventor: Rick D. McGee, Gretna, NE (US)

(73) Assignee: Valmont Industries, Inc., Omaha, NE (US)

( * ) Notice: Subject to any disclaimer, the term of this patent is extended or adjusted under 35 U.S.C. 154(b) by 225 days.

(21) Appl. No.: 15/892,473

(22) Filed: Feb. 9, 2018

Related U.S. Application Data

(60) Provisional application No. 62/458,379, filed on Feb. 13, 2017.

(51) Int. Cl.
| | |
|---|---|
| *H04N 13/204* | (2018.01) |
| *H04N 5/225* | (2006.01) |
| *A01G 25/16* | (2006.01) |
| *G06K 9/00* | (2006.01) |
| *A01G 25/09* | (2006.01) |
| *H04N 13/106* | (2018.01) |
| *H04N 13/15* | (2018.01) |

(52) U.S. Cl.
CPC ........... *H04N 13/204* (2018.05); *A01G 25/09* (2013.01); *A01G 25/16* (2013.01); *G06K 9/00201* (2013.01); *G06K 9/00657* (2013.01); *G06K 9/00791* (2013.01); *H04N 5/2257* (2013.01); *H04N 13/106* (2018.05); *H04N 13/15* (2018.05)

(58) Field of Classification Search
CPC ........... A01B 35/32; A01B 39/06; A01B 3/50; A01B 51/02; A01B 5/16; A01B 69/00; A01B 69/008; A01B 71/02; A01B 76/00; A01B 79/02; H04N 13/204; H04N 13/106; H04N 13/15; H04N 5/2257; A01G 25/09; A01G 25/16; G06K 9/00791; G06K 9/00657; G06K 9/00201
See application file for complete search history.

(56) References Cited

U.S. PATENT DOCUMENTS

| | | | |
|---|---|---|---|
| 5,921,280 | A | 7/1999 | Ericksen et al. |
| 7,093,244 | B2 | 8/2006 | Lajoie et al. |
| 8,589,908 | B2 | 11/2013 | Subbakrishna et al. |
| 9,104,521 | B2 | 8/2015 | Sabet et al. |
| 9,176,725 | B2 | 11/2015 | Lal |

(Continued)

FOREIGN PATENT DOCUMENTS

| | | |
|---|---|---|
| WO | 2007118405 A1 | 10/2007 |
| WO | 2009107000 A3 | 11/2009 |
| WO | 2011005051 A3 | 4/2011 |

*Primary Examiner* — Mohammed S Rahaman
(74) *Attorney, Agent, or Firm* — Milligan PC LLO

(57) ABSTRACT

The present invention provides a system and method for using a 3D scanner to define a path for an irrigation machine to follow using terrain, markings, or other identifiers (natural or manmade). According to a preferred embodiment, identifiers can be programmed into the control computer to recognize location and define steering inputs. The 3D sensors can also identify if a foreign object is present in the path to create notifications and change machine operating parameters (increased safety for collision avoidance). Accordingly, the system of the present invention uses 3D sensor input to modify a predefined path and/or other system parameters in response to detected image data.

12 Claims, 3 Drawing Sheets

(56) References Cited

U.S. PATENT DOCUMENTS

| | | | |
|---|---|---|---|
| 9,348,326 B2 | 5/2016 | Yuh et al. | |
| 9,378,340 B2 | 6/2016 | Cooper et al. | |
| 9,414,552 B2 | 8/2016 | Halahan et al. | |
| 9,443,358 B2 | 9/2016 | Breed | |
| 9,983,041 B1* | 5/2018 | Jerphagnon | A01G 25/16 |
| 2002/0131405 A1 | 9/2002 | Lin et al. | |
| 2003/0179102 A1 | 9/2003 | Barnes | |
| 2004/0005085 A1* | 1/2004 | Andersen | G08B 17/005 |
| | | | 382/109 |
| 2007/0043833 A1 | 2/2007 | Lu et al. | |
| 2011/0145809 A1 | 6/2011 | Hwang | |
| 2011/0301755 A1* | 12/2011 | Anderson | A01G 25/09 |
| | | | 700/246 |
| 2012/0083982 A1* | 4/2012 | Bonefas | G05D 1/0223 |
| | | | 701/70 |
| 2013/0153673 A1* | 6/2013 | Younis | A01G 25/165 |
| | | | 239/1 |
| 2014/0007076 A1 | 1/2014 | Kim et al. | |
| 2014/0146173 A1* | 5/2014 | Joyce | G01C 11/04 |
| | | | 348/144 |
| 2015/0327449 A1 | 11/2015 | Bartlett et al. | |
| 2015/0339116 A1 | 11/2015 | Nekoomaram et al. | |
| 2016/0066505 A1* | 3/2016 | Bakke | H04W 4/70 |
| | | | 700/275 |
| 2016/0306735 A1 | 10/2016 | Adderly et al. | |
| 2017/0251589 A1* | 9/2017 | Tippery | A01G 22/00 |

* cited by examiner

SYSTEM AND METHOD FOR USE OF 3D VISUAL SENSORS ON MECHANIZED IRRIGATION MACHINERY

RELATED APPLICATIONS

The present application claims priority to U.S. Provisional Application No. 62/458,379 filed Feb. 13, 2017.

BACKGROUND AND FIELD OF THE PRESENT INVENTION

1. Field of the Present invention

The present invention relates generally to a system and method for controlling mechanized irrigation machines and, more particularly, to a system and method for steering, adjusting and directing an irrigation machine using a 3D scanner.

2. Background of the Invention

Prior art irrigation machines have used buried wire and RF antennas, furrows, above-ground wires or cables, and/or GPS positioning to define proper the steering paths. The buried wire method is costly to install, and is subject to damage by lightning, rodents, and digging equipment. The buried wire method is also difficult to make path changes. GPS guidance utilizes costly equipment, and is dependent on satellite availability, reference locations, and can require continual software updates. In addition to each of these drawbacks, none of the prior art systems can dynamically react to obstacles such as trees, equipment, or personnel.

The purpose of a 3D scanner is usually to create a point cloud of geometric samples on the surface of the subject. These points can then be used to extrapolate the shape of the subject (a process called reconstruction). If color information is collected at each point, then the colors on the surface of the subject can also be determined.

3D scanners share several traits with cameras. Like most cameras, they have a cone-like field of view, and like cameras, they can only collect information about surfaces that are not obscured. While a camera collects color information about surfaces within its field of view, a 3D scanner collects distance information about surfaces within its field of view. The "picture" produced by a 3D scanner describes the distance to a surface at each point in the picture. This allows the three-dimensional position of each point in the picture to be identified. These devices are used extensively by the entertainment industry in the production of movies and video games. Other common applications of this technology include industrial design, orthotics and prosthetics, reverse engineering and prototyping, quality control/inspection and documentation of cultural artifacts.

SUMMARY OF THE PRESENT INVENTION

To address the shortcomings presented in the prior art, the present invention provides a system and method for using a 3D scanner to define a path for an irrigation machine to follow using terrain, markings, or other identifiers (natural or manmade). According to a preferred embodiment, identifiers can be programmed into the control computer to recognize location and define steering inputs. The 3D sensors can also identify if a foreign object is present in the path to create notifications and change machine operating parameters thus improving the ability of the machine to avoid collisions. Accordingly, the system of the present invention uses 3D sensor input to modify a predefined path and/or other system parameters in response to detected image data.

According to a further aspect of the present invention, the system of the present invention may preferably use 3D image input data to determine the alignment of the irrigation machine, stop locations of various drive towers (Bender, end of field), and/or automated connections (drop spans).

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
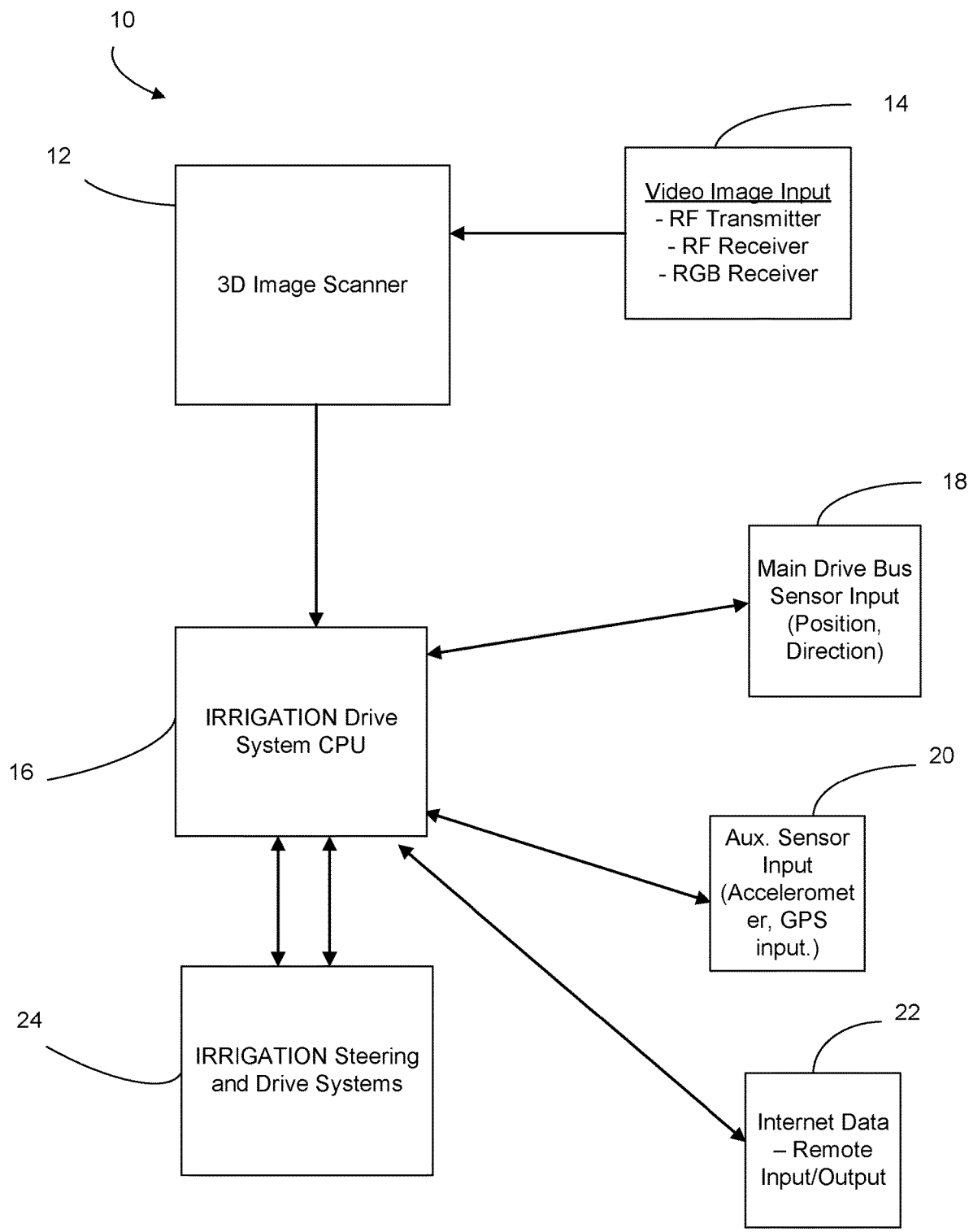
FIG. 1 shows a block diagram of a system in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such as RAM, buffers, cache memory, and network circuits are contemplated to serve as such data storage means according to different embodiments of the present invention.

With reference now to FIG. 1, a block diagram illustrating an exemplary system 10 of the present invention will now be discussed. As shown in FIG. 1, the present invention provides a 3D Image Scanner 12. As shown, the 3D Image Scanner 12 is preferably configured to receive direct video image input 14. Preferably, the 3D Image Scanner 12 preferably further includes an RF transmitter, an RF receiver and an RGB receiver. According to alternative embodiments, the 3D Image Scanner 12 may be configured to receive video images or still images either in color or greyscale for 3D image processing.

As further shown in FIG. 1, 3D Image Scanner 12 preferably further includes one or more image data outputs which preferably direct image data to the drive system CPU 16 for processing and analysis. Preferably, the image data from the 3D Image Scanner 12 is analyzed within the drive system CPU 16 along with input data from other devices and sensors within the irrigation vehicle. The additional inputs preferably include input from a drive bus 18 which preferably provides vehicle related drive data such as engine RPM, IDLE, wheel position, fuel status and the like. The input data preferably further includes input from auxiliary sensors 20 which preferably includes inputs such as GPS location data, accelerometer data, vehicle orientation data, vehicle speed and the like.

The input data preferably further includes remote data inputs 22 which preferably include data such as internet data and remote input/output data. Such data may preferably include image detection data, machine learning algorithms or the like for identification of acquired images. Such image detection data may preferably include 3-dimensional image data representing objects detected by other 3D Image Scanners employed by other irrigation systems or which have been previously detected and stored by 3D Image Scanner 12 or any other system. Preferably, the image detection data may be selected based on the physical distance between the irrigation system and other irrigation systems. In this way, locally occurring image data may preferably be fed to the drive system CPU 16 to aid in the detection of common objects detected within the local region in which the 3D image scanner 12 is used. Further, the 3D image data may preferably be selected and updated based on the time of year, common soil types, common crops and/or common irrigation systems being used. The drive system CPU 16 preferably analyzes each piece of image data, identifies obstacles and environmental factors, and directs the vehicle steering and drive systems 24 accordingly as discussed further below.

Figure 2:
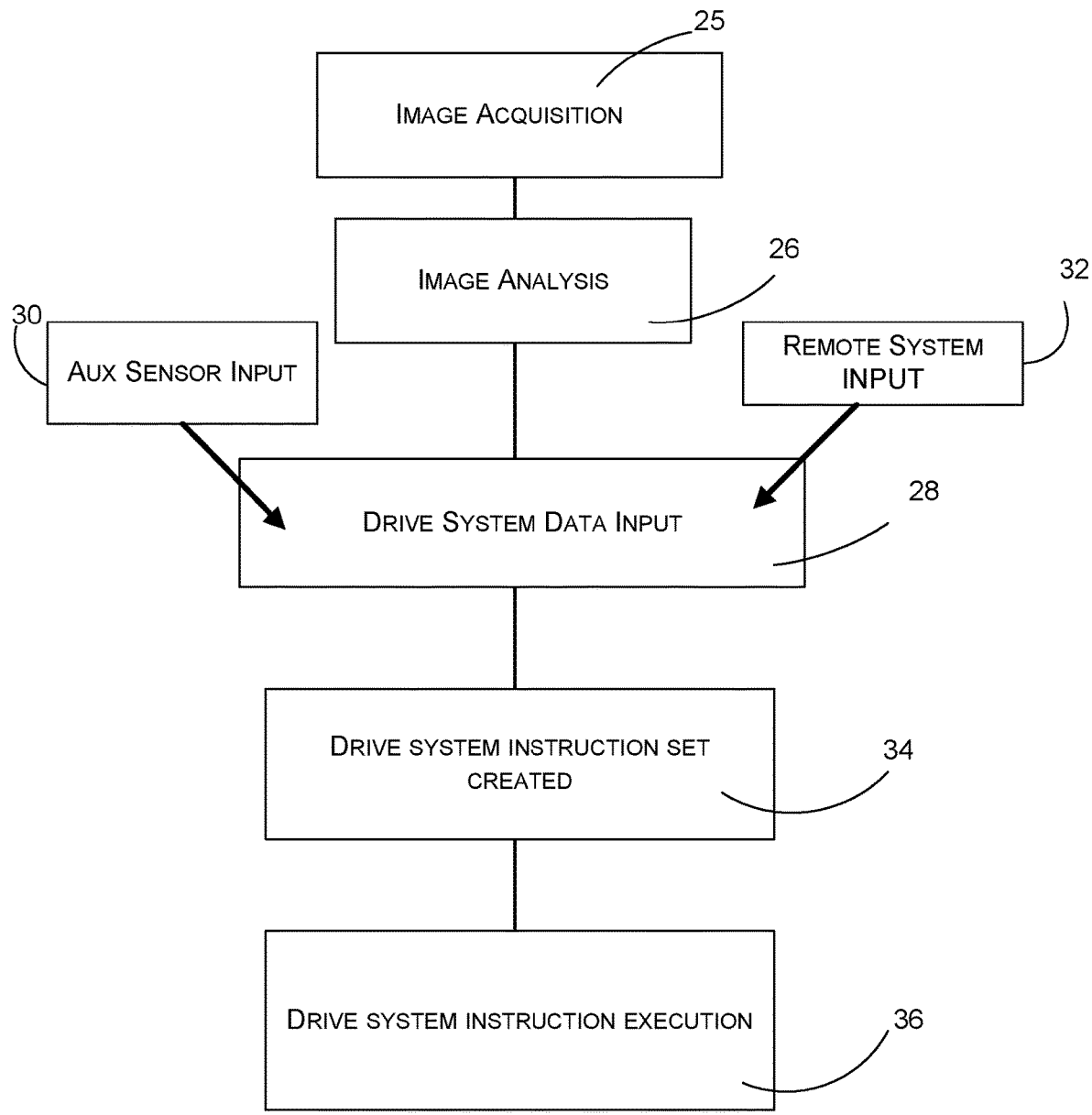
FIG. 2 illustrates a block diagram of an exemplary method for use with the present invention.

With reference now to FIG. 2, an exemplary method in accordance with a first preferred embodiment shall now be discussed. As shown in FIG. 2, at a first step 25 image data is acquired. Thereafter, the image data is analyzed 26 to detect and to identify obstacles and environmental factors/features, and to update crop status information. According to a preferred embodiment, obstacles/features identified may include specially placed markers indicating the desired travel path(s) and/or ground profile(s) (including wheel tracks, furrows, ditch edge or the like). According to a further preferred embodiment, the markers may further provide an indication of the optimal travel path(s) including identification of any obstacles such as tree limbs, eroded ditches and the like. Further, the image data may be analyzed to detect and calculate an erosion rate.

As further shown, auxiliary sensor input is received 30 along with remote system input 32 and provided to the drive system data input 28. With the collected data, the drive system CPU preferably then creates a drive system instruction set 34 which is transmitted to the drive system for execution 36.

According to further aspects of the present invention, the data from the 3D image scanner 12 is preferably further used by the system CPU 16 in conjunction with auxiliary sensor input 20 and stored mapping data to further provide command and control instructions for the irrigation drive systems 24. For example, the system CPU 16 may in a first instance use GPS data and stored mapping data to provide a first irrigation path for the drive system 24 to follow. Thereafter, the CPU 16 may further use input from the 3D image scanner 12 to create adjustments to the GPS determined irrigation path during irrigation. In this way, data from the 3D image scanner could be used for obstacle avoidance for obstacles which are encountered during the traversal of an irrigation path navigated by the system using GPS and stored map data. Further, data from the 3-D image scanner 12 could be used by the CPU 16 to correct the path of the machine during subsequent passes more accurately than other methods (e.g. GPS, RTK). Still further, the data from the scanner may preferably be used by the CPU to fully guide the machine along the irrigation path without GPS or other external guidance signals.

Figure 3:
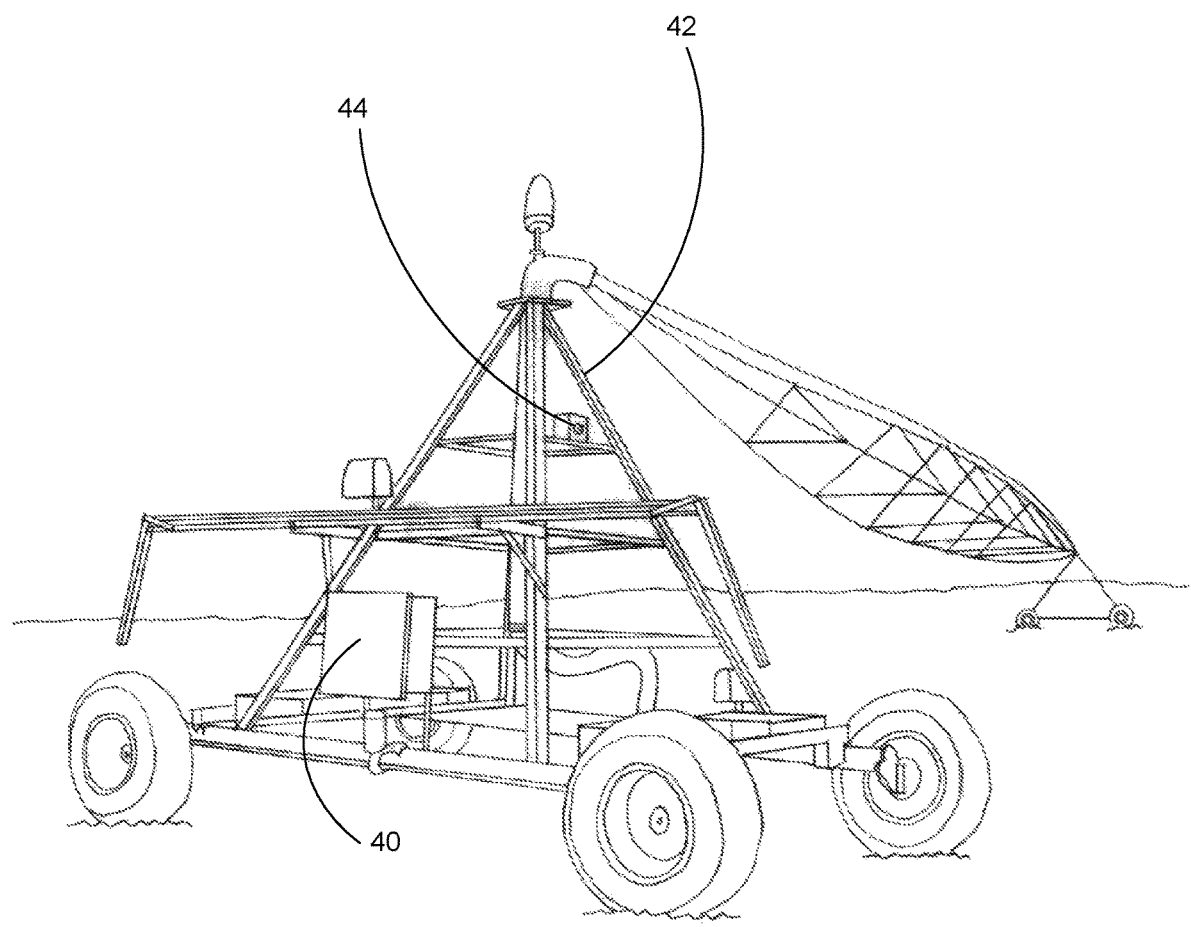
FIG. 3 shows exemplary machinery employing a 3D sensor in accordance with an embodiment of the present invention.

With reference now to FIG. 3, an exemplary irrigation machine 42 employing a 3D sensor in accordance with an embodiment of the present invention is shown. As shown, the 3D sensor 44 of the present invention can be mounted on an irrigation system 42 which may be linear, center pivot or any other configuration. As discussed above, with the 3D sensor data, the drive system 40 of the irrigation system 42 may preferably be controlled and directed with data obtained from the 3D sensor 44 in combination with other input data. According to the present invention, the control of the irrigation system 42 may preferably including starting and stopping, steering and other driving maneuvers.

According to a further aspect of the present invention, the disclosed 3D scanner/irrigation system can be used to create a path for the irrigation system to follow. For example, the path may preferably be defined with terrain, markings, or other identifiers (natural or manmade) such as reflectors spaced uniformly along the path, tire tracks, the edge of the neighboring water supply canal, a berm or furrow of soil, or the like. According to a further aspect of the present invention, identifiers can be programmed into the control computer to recognize location and define steering inputs. Further, the 3D sensors may preferably be used to identify if a foreign object is present in the path to create notifications and change machine operating parameters accordingly.

According to a further preferred embodiment, the present invention preferably uses 3D sensor input to define and trigger dynamic reactions of both the drive system and the irrigation systems of an irrigation machine in response to detected image characteristics. In this way, the path and direction of the system can be modified to avoid obstacles, or change the irrigation and/or drive programs accordingly. Further, the 3D image inputs may also be used to identify crop characteristics such as growth stage. With this crop data, the system may use the growth stage and other crop characteristics to determine adjustments to the operating parameters of the irrigation system, such as changing speeds, adjusting sprinkler height, or modifying irrigation applications. Further the data input from the 3D scanners may also be used to determine the alignment of the machine, stop locations of drive towers (e.g. bender or end of field towers), automated connections (drop spans) and the like.

While the above descriptions regarding the present invention contain much specificity, these should not be construed as limitations on the scope, but rather as examples. Many other variations are possible. Accordingly, the scope should be determined not by the embodiments illustrated, but by the appended claims and their legal equivalents.

What is claimed is:

1. A method for controlling and directing one or more drive units within an irrigation system, the method comprising:

acquiring 3D image data, wherein the 3D image data is generated by a 3D image scanner;

acquiring system drive data; wherein the system drive data is comprised of data selected from a group data comprising: engine RPMs, engine idle, vehicle speed and wheel position data;

inputting auxiliary sensor input data, wherein the auxiliary sensor input data is comprised of GPS location data, accelerometer data, and vehicle orientation data;

analyzing the 3D image data to produce a first set of analyzed image data, wherein the 3D image data is analyzed to detect and identify objects within a field to be irrigated; wherein the image data is selected and updated based on the time of year;

generating a first set of drive system instructions for directing one or more drive units of the irrigation system, wherein the first set of drive system instructions are generated using, at least in part, system drive data and auxiliary sensor input data;

modifying the first set of drive system instructions using, at least in part, the first set of analyzed image data;

modifying the first set of drive system instructions using, at least in part, a second set of analyzed image data;

providing the modified first set of drive systems instructions to a drive system CPU of the irrigation drive unit; and executing the modified first set of drive system instructions; and querying remote data inputs for remote image detection data; wherein the remote image detection data comprises data from remotely acquired images; wherein the remote data inputs comprise image data representing objects detected by one or more remote irrigation systems;

analyzing the 3D image data using, at least in part, the remote image detection data to produce a second set of analyzed image data; wherein the remote data input is selected based on the physical distance between the 3D image scanner and the remote irrigation systems.

2. The method of claim 1, wherein the 3D image data is received by an RGB receiver.

3. The method of claim 2, wherein the 3D image data is acquired as video.

4. The method of claim 3, wherein the 3D image data includes color image data.

5. The method of claim 1, wherein the image data is acquired as still images.

6. The method of claim 1, wherein the image data is acquired in greyscale.

7. The method of claim 1, wherein the image data is selected and updated based upon a common soil type.

8. The method of claim 1, wherein the image data is selected and updated based on a common crop type.

9. The method of claim 1, wherein the image data is further selected and updated based on the type of irrigation system used with the 3D image scanner.

10. The method of claim 1, wherein the image data is used to identify tree limbs.

11. The method of claim 1, wherein the image data is used to detect changes in ground elevation.

12. The method of claim 11, wherein the image data is used to calculate an erosion rate.

* * * * *